United States Patent
Zuckerberg et al.

(10) Patent No.: US 9,049,203 B2
(45) Date of Patent: Jun. 2, 2015

(54) SYSTEMS AND METHODS FOR DYNAMICALLY GENERATING A PRIVACY SUMMARY

(75) Inventors: Mark Zuckerberg, Palo Alto, CA (US); Chris Kelly, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 213 days.

(21) Appl. No.: 13/533,883

(22) Filed: Jun. 26, 2012

(65) Prior Publication Data
US 2012/0272332 A1    Oct. 25, 2012

Related U.S. Application Data

(63) Continuation of application No. 11/493,291, filed on Jul. 25, 2006, now Pat. No. 8,225,376.

(51) Int. Cl.
*H04L 29/06* (2006.01)
*H04L 29/08* (2006.01)

(52) U.S. Cl.
CPC ............ *H04L 63/102* (2013.01); *H04L 67/306* (2013.01)

(58) Field of Classification Search
CPC ........................... H04L 63/102; H04L 67/306
USPC .................................................. 726/4; 706/12
See application file for complete search history.

(56) References Cited

U.S. PATENT DOCUMENTS

| | | | |
|---|---|---|---|
| 6,633,311 B1 | 10/2003 | Douvikas et al. | |
| 7,512,653 B2 | 3/2009 | Krishnasamy et al. | |
| 8,037,139 B1 | 10/2011 | Fish et al. | |
| 2005/0021750 A1 | 1/2005 | Abrams | |
| 2005/0256866 A1 * | 11/2005 | Lu et al. | 707/5 |
| 2006/0004680 A1 | 1/2006 | Robarts et al. | |
| 2006/0167991 A1 | 7/2006 | Heikes et al. | |
| 2007/0266003 A1 * | 11/2007 | Wong et al. | 707/3 |

OTHER PUBLICATIONS

Pollack, G.E., Request for Ex Parte Reexamination Under 37 C.F.R. § 1.510 of U.S. Patent No. 8,225,376 B2, Sep. 14, 2012, 57 pages.

* cited by examiner

*Primary Examiner* — Brandon Hoffman
*Assistant Examiner* — Thong Truong
(74) *Attorney, Agent, or Firm* — Fenwick & West LLP

(57) ABSTRACT

A system and method for is provided. The present invention provides a system and method for dynamically generating a privacy summary. A profile for a user is created. One or more privacy setting selections are received from the user associated with the profile. The profile associated with the user is updated to incorporate the one or more privacy setting selections. A privacy summary is then generated for the profile based on the one or more privacy setting selections.

21 Claims, 6 Drawing Sheets

Contact Information ~402

Select who can see each piece of your contact information:

Preferred Email ~404

☐ Everyone from San Francisco, CA, Social Network Provider, and Harvard ~410
☐ Friends of your friends from San Francisco, CA, Social Network Provider, and Harvard
☐ Only your friends
☐ No one Mobile Phone ~406

☐ Everyone from San Francisco, CA, Social Network Provider, and Harvard ~410
☐ Friends of your friends from San Francisco, CA, Social Network Provider, and Harvard
☐ Only your friends
☐ No one Friends ~408

Select who can see your friends:

☐ Everyone ~410
☐ Everyone from San Francisco, CA, Social Network Provider, and Harvard
☐ Friends of your friends from San Francisco, CA, Social Network Provider, and Harvard
☐ Only your friends

FIG. 4

My Privacy

Privacy Summary

Your Social Network Provider makes it possible to share as much information as you want by giving you control over who sees what. This summary explains what people can see based on your settings.

Profile

San Francisco, CA, Social Network Provider, and Harvard

People from San Francisco, CA, Social Network Provider and Harvard can see your profile and the information you put in it. Your profile includes your picture, interests, contact information, photo albums and other things. Some of your contact information, like your email, AIM, mobile phone, home phone and home address, will only be available to your friends. And because you restricted your privacy settings, only your friends of friends can see your list of friends.

Edit Settings ~502

Everyone Else

Outside of San Francisco, CA, Social Network Provider and Harvard, only your friends can see your profile. You cannot change this setting.

Photos ~504

You have four photo albums on Social Network Provider. Of those, your friends and people from San Francisco, CA, Social Network Provider and Harvard can see two of them. Only your friends can see all of your albums. In addition to this, you have tagged friends in some photos, so those photos will appear whenever anyone views photos of the friends you tagged. Photos without tags will not be visible to people outside of your friends and San Francisco, CA, Social Network Provider and Harvard.

Edit Settings ~502

SYSTEMS AND METHODS FOR DYNAMICALLY GENERATING A PRIVACY SUMMARY

RELATED APPLICATIONS

This application is a continuation of U.S. application Ser. No. 11/493,291, files on Jul. 25, 2006, entitled "Systems and Methods for Dynamically Generating a Privacy Summary", which is incorporated herein by reference in its entirety.

BACKGROUND OF THE INVENTION

1. Field of the Invention

The present invention relates generally to privacy settings, and more particularly to systems and methods for dynamically generating a privacy summary.

2. Description of Related Art

Conventionally, users of networking websites connect with other users by providing information about themselves. For example, a user may post contact information, background information, current job position, hobbies, and so forth. Other users may contact the user based on common interests or for any other reason.

Recently, social networking websites have developed systems for better connecting various users. For example, users may be grouped together based on geographical location, job type, and so forth. As social networking has grown more popular, users have realized a need for a certain amount of privacy. In other words, not every particular user wants all the other users to be able to access the information about the particular user.

There are existing mechanisms that allow the user to display information about the user or to not display the information. Some mechanisms may allow the user to select settings that display only certain information to the users. Typically, however, these mechanisms are all or nothing. In other words, the user can choose to display pieces of the information or not. Further, often the user is unaware of what the settings selected represent with respect to the information that will, or will not, be displayed about the user.

SUMMARY OF THE INVENTION

The present invention provides a system and method for dynamically generating a privacy summary. In a method according to one embodiment of the invention, a profile for a user is created. One or more privacy setting selections are received from the user associated with the profile. The profile associated with the user is updated to incorporate the one or more privacy setting selections. A privacy summary is then generated for the profile based on the one or more privacy setting selections.

BRIEF DESCRIPTION OF THE DRAWINGS

FIG. 4 illustrates a schematic diagram of an exemplary privacy setting selections screen;

FIG. 5 illustrates a schematic diagram of an exemplary privacy summary; and

DETAILED DESCRIPTION OF THE INVENTION

A system and method for dynamically generating a privacy summary is provided. A user may select privacy settings associated with various groups or categories. A user profile may then be updated to reflect the privacy settings selected. A privacy summary is generated based on the privacy settings selected associated with the user profile. The privacy summary may be displayed to the user as a narrative explaining what each other user or group of users can access about the user based on the privacy settings selected by the user. Accordingly, a particular user may better be able to understand the access to the particular user's information granted to other users based on the privacy summary.

Figure 1:
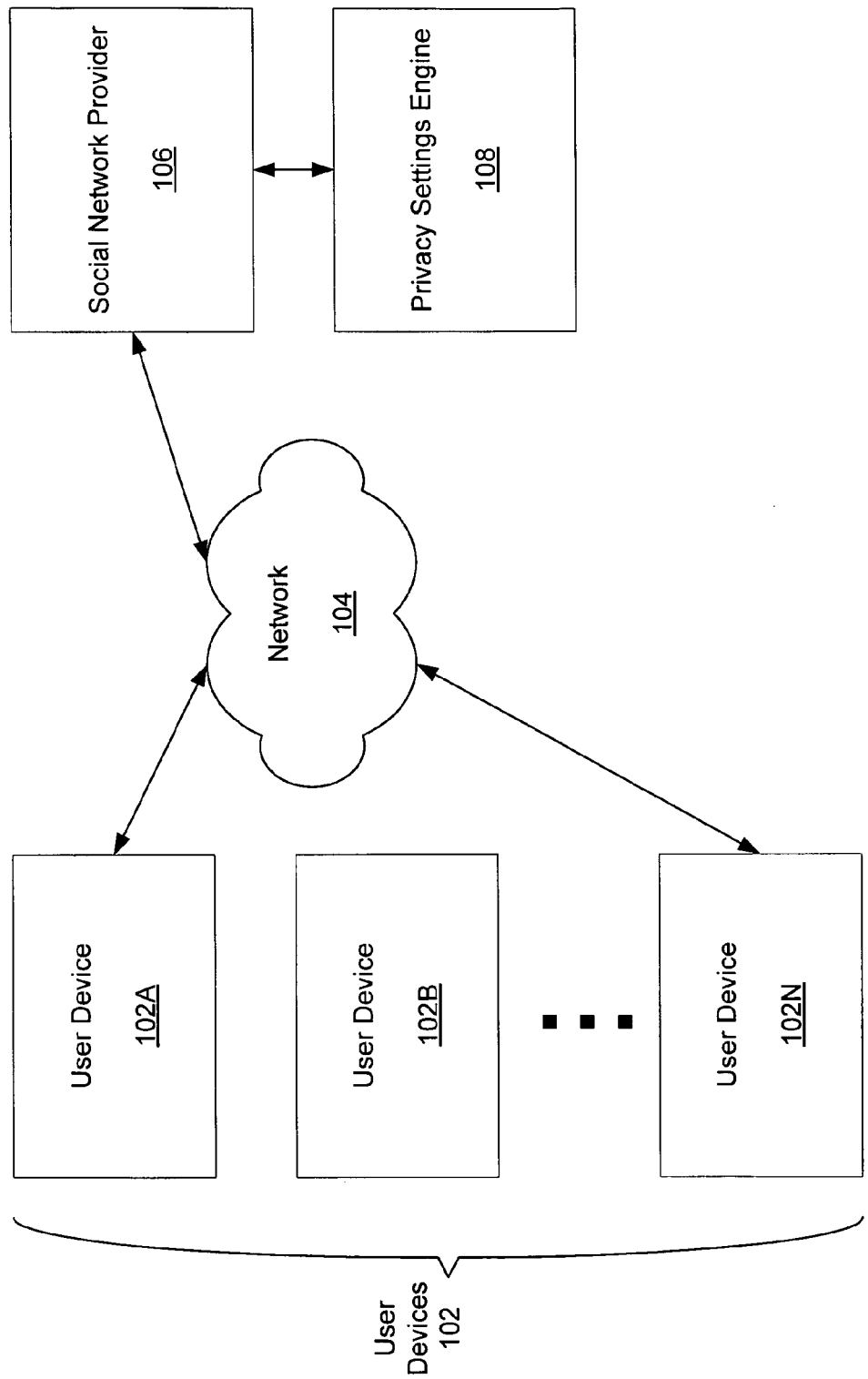
FIG. 1 illustrates a schematic diagram of an exemplary architecture for dynamically generating a privacy summary.

FIG. 1 illustrates a schematic diagram of an exemplary architecture for dynamically generating a privacy summary. User devices 102, such as a user device 102A, a user device 102B, and a user device 102N, communicate over a network 104 with a social network provider 106. The user devices 102A-102N may comprise any device associated with one or more users, such as a cellular telephone, a personal digital assistant, a desktop or a laptop computer, and so forth. Any type of user devices 102 are within the scope of various embodiments.

The social network provider 106 may comprise any user or entity that provides social networking services, communication services, dating services, and so forth. For example, the social network provider 106 may host a website that allows one or more users at the user devices 102 to communicate with one another via the website. In one instance, the user associated with the user device 102A may communicate with the user associated with the user device 102B via a social networking website associated with the social network provider 106 that offers the user an opportunity to connect or reconnect with one or more other users that attended, for example, the same university as the user.

A privacy settings engine 108 is coupled to the social network provider 106. The privacy settings engine 108 can receive privacy settings selections from the users at the user devices 102. The privacy settings engine 108 can save the privacy setting selections to a profile associated with each user. Once the privacy setting selections are selected by the user, the privacy settings engine 108 can generate a privacy summary for the user that explains to the user what each of the privacy settings selections means with respect to what other users can access about the user that selected the privacy settings.

For example, a user at the user device 102A selects an option to display photos associated with a user profile for the user only to "friends" of that user. The privacy summary generated by the privacy settings engine 108 explains that people that comprise the "friends" grouping will be able to view photos and photo albums for the user, but people that comprise the "school" grouping and the "geography" grouping will not be able to access the photos.

Although the users at the user devices 102 can group other users according to categories, such as "friends", "school", "geography", "business", and so forth, any type of grouping may be employed by the user and/or the social network provider 106. Further, according to some embodiments, the user may select privacy settings for individual users. For instance, the user may select privacy settings for Jane, privacy settings for John, and/or privacy settings for grouping of users, which may or may not include Jane and John.

Figure 2:
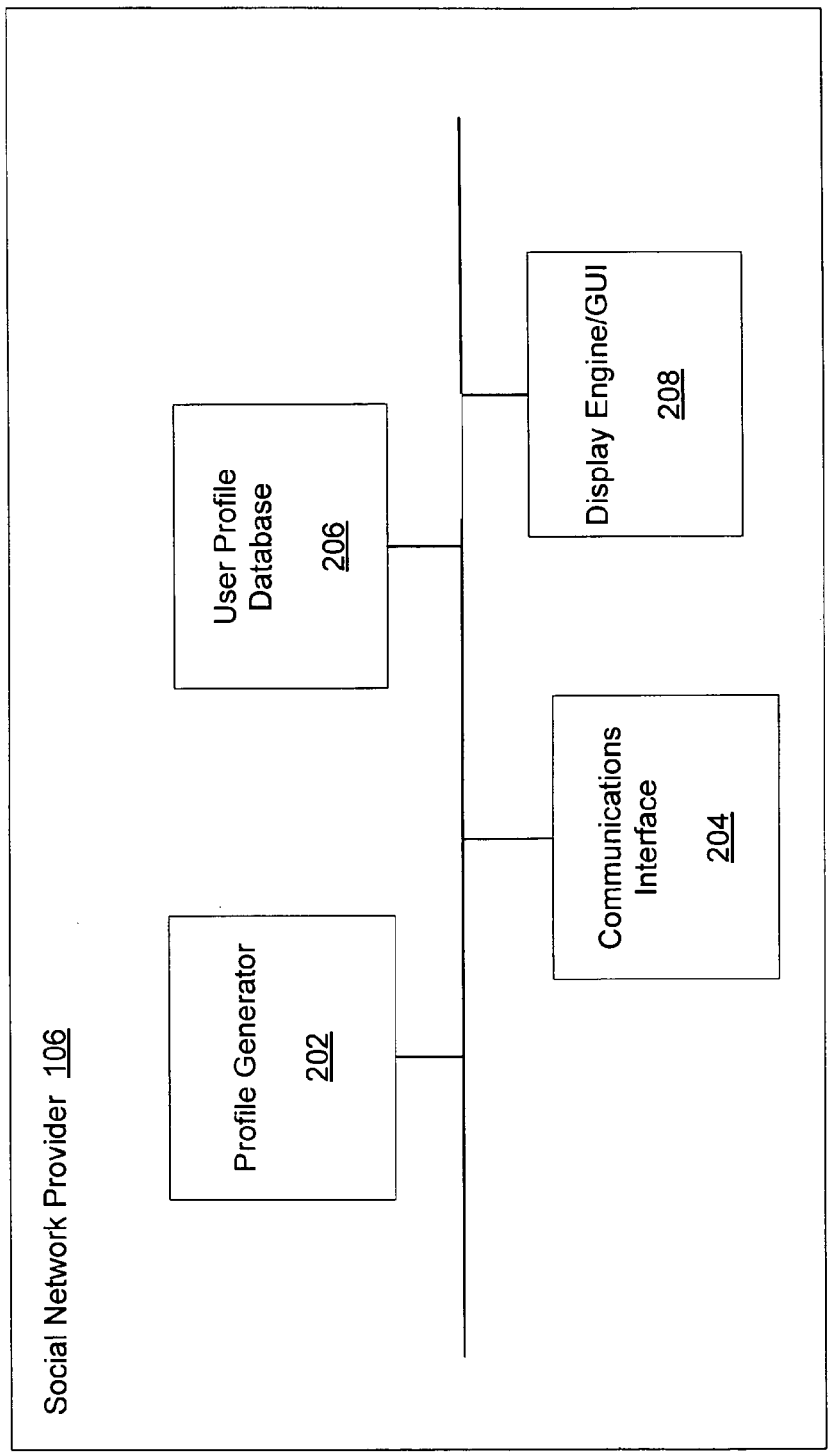
FIG. 2 illustrates a schematic diagram of an exemplary social network provider.

Referring now to FIG. 2, an exemplary social network provider 106 is illustrated. The social network provider 106 may comprise a server, a client device, or any other device.

The social network provider 106 includes a profile generator 202 for creating the profile for the user, as discussed herein. For example, the user may provide contact information, friends, photos, and so forth to associate with the profile for the user. The profile generator 202 utilizes the information provided by the user to create the profile (i.e., the user profile). As discussed herein, the profile may include one or more categories or subcategories and privacy settings selection may be provided for each of the one or more categories or subcategories.

The social network provider 106 includes a communications interface 204 for communicating with the user devices 102, such as the user device 102A-102N described herein, over the network 104. The user devices 102 communicate various types of information, such as privacy settings selections, groupings of other users, and so forth to the social network provider 106 via the communications interface 204. Any type of communications interface 204 is within the scope of various embodiments.

A display engine/GUI 206 may also be provided by the social network provider 106. The display engine/GUI 206 displays the privacy settings selections, privacy summary, and so forth to the users associated with the user devices 102. The users can interact with the social network provider 106 via the display engine/GUI 206. For example, the users can select privacy settings, change privacy settings, access their own user profile, access other users' information available via the social network provider, and so forth via the display engine/GUI 206.

A user profile database 208 is provided for storing data associated with each of the users, such as the users associated with the user device 102A-102N, in the user profiles created by the profile generator 202. When the users at the user devices 102 select the privacy settings to associate with their user profiles, the user profile database 208 updates the user data associated with each user profile. Accordingly, the privacy settings selections are stored in association with each user profile. The user profiles and/or the privacy settings selections may be stored, modified, added, and so forth to any storage medium, according to some embodiments.

According to exemplary embodiments, one or more networks may be provided for each user. Each user may select different privacy settings for different networks. For example, the user at the user device 102A may have a network comprised of people grouped according to a university attended, a network comprised of people grouped according to the user's geographical location of residence, a network comprised of people grouped according to a common field of work, a network comprised of people grouped according to a particular business, and so forth. The user at the user device 102A can then select privacy settings for each of these networks.

Any type of network may be provided by the social network provider 106. In other words, a network may comprise people grouped according to any type of category, such as various social networks described herein, like "friends", "geographical location", and so forth. The user may specify the networks, the categories, subcategories, and so forth and/ or the networks, the categories, the subcategories, and so on may be predetermined by the social network provider 106.

A single user profile may be comprised of the various networks in which the user participates, with different privacy setting options available for each network, as discussed herein. For example, the user at the user device 102A may select different privacy settings for a university network and for a geographical location network. Alternatively, the user at the user device 102A may have a separate user profile for each network in which the user participates, with different privacy setting options available for each user profile. For example, the user at the user device 102A may have a separate user profile for the university network and for the geographical location network, each user profile having privacy setting options available for each network by virtue of the separate user profiles associated with each of the networks.

According to some embodiments, the user can select the same privacy settings for one or more of the networks. In other words, the social network provider 106 may provide the user with an option to select privacy settings once for more than one of the networks and/or more than one category or subcategory. Accordingly, the user may select one set of privacy settings for both the university network and the geographical location network.

Although the social network provider 106 is described as being comprised of various components (the communications interface 204, the display engine/GUI 206, and the user profile database 208), fewer or more components may comprise the social network provider 106 and still fall within the scope of various embodiments.

Figure 3:
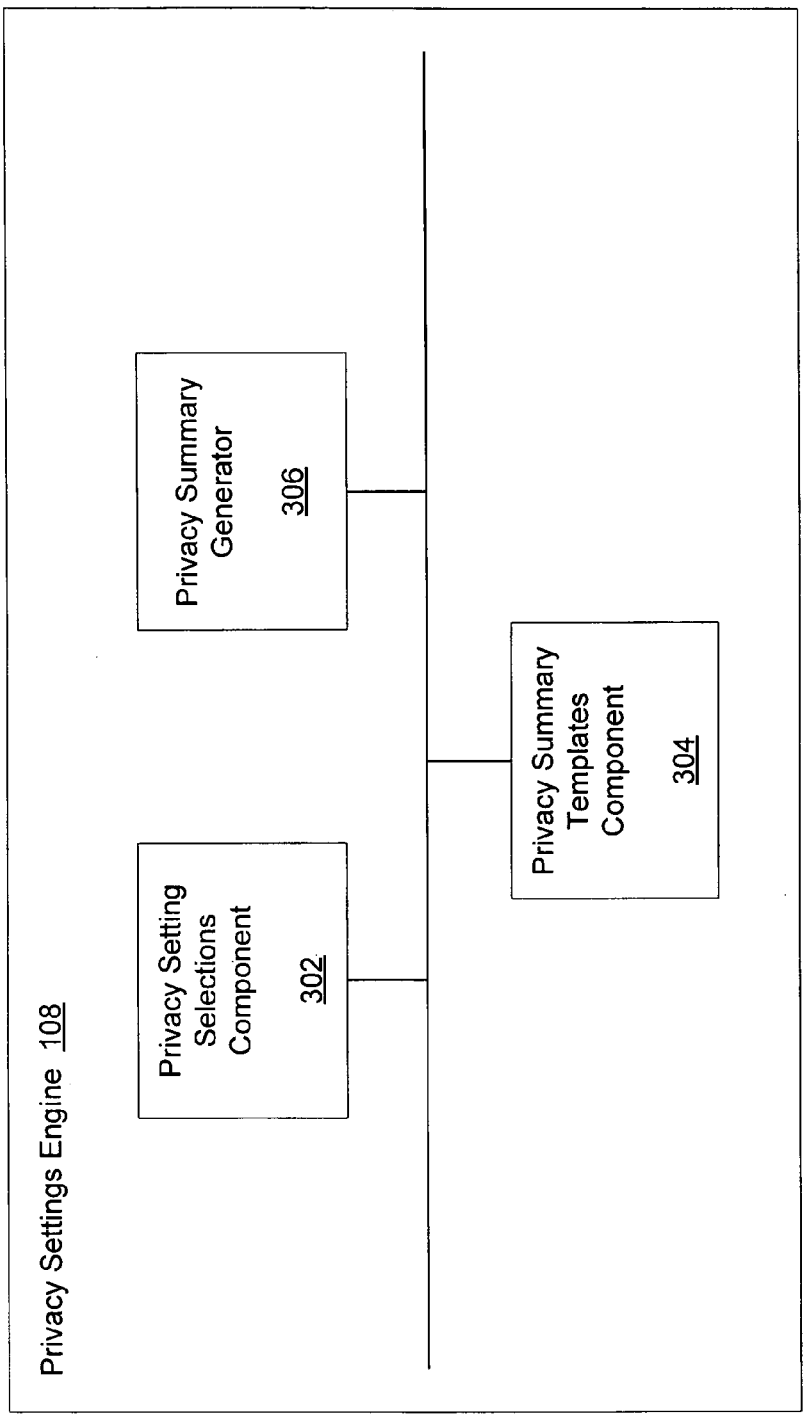
FIG. 3 illustrates a schematic diagram of an exemplary privacy settings engine.

FIG. 3 illustrates a schematic diagram of an exemplary privacy settings engine 108. A privacy setting selections component 302 receives the privacy settings selections from the user. For example, the user associated with the user device 102A selects from various options related to privacy for one or more networks, categories, and/or subcategories. The privacy setting selections component 302 updates the user profile, such as the user profile stored in the user profile database 208, with the privacy settings selected by the user.

A privacy summary templates component 304 utilizes the privacy setting selections to determine which privacy summary templates apply given the particular privacy setting selections from the user. For example, the privacy summary templates component 304 can match a privacy paragraph to each privacy setting selection, such as "only your friends." The privacy paragraph may change for privacy setting selections in different categories. For example, the privacy paragraph for "only your friends" in a photo album category may be different from the privacy paragraph for "only your friends" in a contact information category. Alternatively, the privacy paragraph for one or more of the privacy settings selections may be shared among one or more categories. Any number of privacy summary templates may be provided.

A privacy summary generator 306 utilizes the privacy summary templates from the privacy summary templates component 304 to create an entire privacy summary. According to some embodiments, the privacy summary templates component 304 comprises a database or other storage medium that stores the privacy summary templates, which the privacy summary generator 306 accesses in order to generate the privacy summary. The privacy summary generator may modify the privacy summary templates, in order to customize the privacy summary, according to some embodiments. For instance, the privacy summary generator 306 may insert the particular network name, such as Yale, San Jose, Calif., and so forth, into the privacy summary in order to customize the privacy summary for the particular user to whom the privacy setting selections are being explained via the privacy summary.

The privacy summary generator 306 may then forward the privacy summary to the display engine/GUI 206 for display to the user associated with the particular privacy summary. The privacy setting selections and the privacy summary are discussed in further detail in association with FIGS. 4 and 5.

FIG. 4 shows a schematic diagram of an exemplary privacy setting selections screen 400. A category of "contact information" 402 is displayed. Accordingly, the user may select from various privacy settings related to the user's contact information 402. As discussed herein, the user may choose from various privacy settings related to any category or subcategory, such as a bulletin board for the particular user, groups for the particular user, friends for the particular user, profile for the particular user, status for the particular user, photos for the particular user, and so forth.

In the screen 400 in FIG. 4, the user can select privacy settings for the categories "preferred email" 404, "mobile phone" 406, and "friends" 408. The contact information 402 category may include fewer or more categories or subcategories and still fall within the scope of various embodiments. Further, each category or subcategory, such as categories 404, 406, and 408, on the screen 400 includes four options 410, but fewer or more options, such as the options 410 on the screen 400, may be provided and still fall within the scope of various embodiments. Once the user selects one or more of the options 410 for the contact information 402 category, the user profile database 208 is updated to reflect the privacy setting selections chosen from the options 410.

As discussed herein, the display engine/GUI 206 may display the privacy settings selection 400 screen. Further, as also discussed herein, the user may input selections for various privacy setting selections associated with one or more categories other than the contact information 402 category shown in FIG. 4. Accordingly, the user profile database 208 is updated with the user's privacy setting selections for each category and/or subcategory. The user profile and/or the privacy setting selections, directly, are utilized by the privacy summary generator 306 to create the privacy summary. The display engine/GUI 206 is then utilized to display the privacy summary to the user, in order to better assist the user in understanding the consequences of the privacy setting selections chosen by the user.

Referring now to FIG. 5, an exemplary privacy summary 500 is shown. As discussed herein, the privacy summary 500 utilizes the privacy setting selections from the user and explains, according to the category, the subcategory, and/or the network, what the user's selections from the privacy setting selections mean. For example, assume that the user at the user device 102A selected the option "everyone from San Francisco, Calif., Social Network Provider, and Harvard" from options provided in association with a "profile" category (not shown) and the option 410 "only your friends" for the category the contact information 402, discussed in FIG. 4. Accordingly, the privacy summary indicates to the user that people comprising the geographical location network "San Francisco, Calif.", people using or subscribed to the Social Network Provider's services, such as the social network provider 106 discussed herein, and people comprising the college network "Harvard" can access the profile for the user at the user device 102A. On the other hand, the privacy summary 500 also indicates to the user that since the user selected the option 410 "only your friends" for the category of the contact information 402, the privacy setting selection of the option 410 "only your friends" means that only people comprising the category or the subcategory of "friends" can access the preferred email 404, the mobile phone 406, the friends 408 grouping, and other contact information such as, for example, the instant messenger address (not shown), the home phone (not shown), and the home address (not shown) associated with the profile for the user at the user device 102A. Thus, people comprising "friends of your friends from San Francisco, Calif., Social Network Provider, and Harvard" and "everyone from San Francisco, Calif., Social Network Provider, and Harvard" cannot access the contact information 402 for the user at the user device 102A. Further, because the user at the user device 102A restricted the privacy settings, only "friends of friends" can see the user's list of friends. Thus, any user accessing data via the social network provider 106 cannot view the user's list of friends unless that particular user happens to also be grouped in the "friends" of the user's "friends from San Francisco, Calif., Social Network Provider, and Harvard."

The user may select an "edit settings" link 502 in order to edit the privacy setting selections chosen. The user can access the "edit settings" link 502 via the privacy summary 500 or the user can access the privacy setting selections in any other manner, such as by selecting a category or subcategory from the user's profile and modifying the privacy setting selections for the category or subcategory selected. As discussed herein, any type of networks, categories, subcategories, and privacy setting selections may be provided. Further, any type of privacy summary may be generated for explaining the privacy setting selections chosen by the user at the user device 102A and what the particular privacy setting selections mean with respect to what other users can access about the user at the user device 102A.

The privacy settings selection for the category of "photos" 504 is also explained in the exemplary privacy summary 500 shown in FIG. 5. As discussed herein, different paragraphs explaining the privacy setting selections may be provided for each category, combined paragraphs may explain privacy setting selections for one or more categories, and so forth. One or more "edit settings" links 502 may be provided for allowing the user to change the privacy setting selections from the privacy summary 500.

Figure 6:
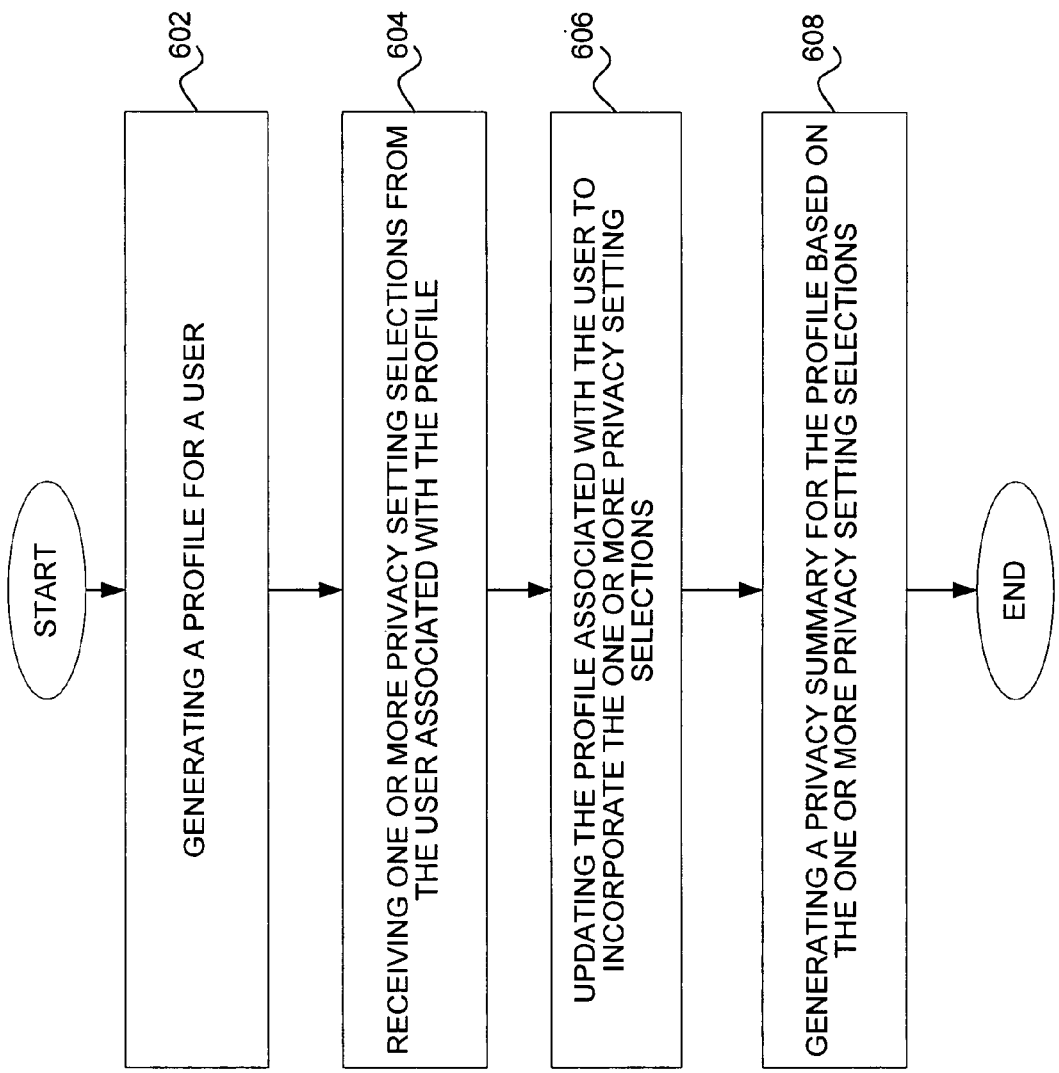
FIG. 6 illustrates a flow chart showing an exemplary process for dynamically generating a privacy summary.

FIG. 6 illustrates a flow diagram of an exemplary process for dynamically generating a privacy summary. At step 602, a user profile is created. As discussed herein, the user profile may include one or more networks or separate user profiles may be created for one or more networks, such as a geographical location network, a college network, and so forth. The user profile may include one or more categories or subcategories, such as photos, groups, friends, bulletin board, contact information, events, and so forth.

At step 604, one or more privacy setting selections are received from a user associated with the profile. As discussed herein, the user may enter the privacy setting selections via the display engine/GUI 206 at the social network provider 106. Thus, the user can control the information people see in the user's profile.

At step 606, the profile associated with the user is updated to incorporate the one or more privacy setting selections. As discussed herein, the privacy setting selections are used to update the user profile in the user profile database 208 in order to reflect choices regarding privacy from the user and to associate those choices regarding privacy with the one or more networks, categories, and or subcategories specified by the user and/or the social network provider 106.

At step 608, a privacy summary for the profile is generated based on the one or more privacy setting selections. As discussed herein, the profile for the particular user making the privacy setting selections includes the privacy summary explaining to the particular user the consequences or meaning of the privacy setting selection. The privacy summary, such as the exemplary privacy summary 500 illustrated in FIG. 5, may explain the privacy setting selections for each network, category, and/or subcategory. Further, the privacy summary 500 may combine explanations for the one or more networks, categories, and/or subcategories into one or more categories.

While various embodiments have been described above, it should be understood that they have been presented by way of example only, and not limitation. For example, any of the elements associated with the privacy summary may employ any of the desired functionality set forth hereinabove. Thus, the breadth and scope of a preferred embodiment should not be limited by any of the above-described exemplary embodiments.

What is claimed is:

1. A method comprising:
    receiving information content from a user of a social networking system posted to a user profile;
    receiving, from the user via a privacy selection interface, a plurality of privacy selections from a set of privacy selections, each of one or more of the received privacy selections identifying a set of other users who can access the posted information content;
    updating the user profile to incorporate the received privacy selections for the posted information content;
    generating, by a processor, a narrative summary of the sets of other users identified by the received privacy selections that can access the posted information content, the narrative summary comprising a text statement that identifies the sets of users who can access the information content based on the privacy selections, wherein the received privacy selections contain fewer than all of the set of privacy selections; and
    displaying the generated narrative summary to the user in a privacy summary interface associated with the posted information content, the privacy summary interface separate from the privacy selection interface.

2. The method recited in claim 1, further comprising:
    receiving a request by a second user to access the user profile;
    determining if the second user is identified by the privacy selections; and
    responsive to a determination that the second user is identified by the privacy selections, displaying the posted information content to the second user.

3. The method recited in claim 1, wherein the privacy summary interface comprises a portion of the user profile.

4. The method recited in claim 1, wherein receiving a plurality of privacy selections from a set of privacy selections at the privacy selection interface comprises receiving a selection of one or more individual users from the user.

5. The method recited in claim 1, wherein the posted information content comprises a status posted to the user profile.

6. The method recited in claim 1, wherein the posted information content comprises an image posted to the user profile.

7. The method recited in claim 1, wherein the generated narrative summary of the sets of other users comprises a categorization of the sets of other users into one or more groups or networks.

8. A system comprising:
    a processor; and
    a non-transitory computer-readable storage medium storing instructions configured to, when executed by the processor, cause the system to:
        receive information content from a user of a social networking system posted to a user profile;
        receive from the user via a privacy selection interface, a plurality of privacy selections from a set of privacy selections, each of one or more of the received privacy selections identifying a set of other users who can access the posted information content;
        update the user profile to incorporate the received privacy selections for the posted information content;
        generate, by a processor, a narrative summary of the sets of other users identified by the received privacy selections that can access the posted information content, the narrative summary comprising a text statement that identifies the sets of users who can access the information content based on the privacy selections, wherein the received privacy selections contain fewer than all of the set of privacy selections; and
        display the generated narrative summary to the user in a privacy summary interface associated with the posted information content, the privacy summary interface separate from the privacy selection interface.

9. The system recited in claim 8, wherein the instructions are configured to further cause the system to:
    receive a request by a second user to access the user profile;
    determine if the second user is identified by the privacy selections; and
    responsive to a determination that the second user is identified by the privacy selections, display the posted information content to the second user.

10. The system recited in claim 8, wherein the privacy summary interface comprises a portion of the user profile.

11. The system recited in claim 8, wherein receiving a plurality of privacy selections from a set of privacy selections at the privacy selection interface comprises receiving a selection of one or more individual users from the user.

12. The system recited in claim 8, wherein the posted information content comprises a status posted to the user profile.

13. The system recited in claim 8, wherein the posted information content comprises an image posted to the user profile.

14. The system recited in claim 8, wherein the generated narrative summary of the sets of other users comprises a categorization of the sets of other users into one or more groups or networks.

15. A non-transitory computer program embodied on a computer readable storage medium having encoded thereon instructions for dynamically generating a privacy summary comprising:
    receiving information content from a user of a social networking system posted to a user profile;
    receiving, from the user via a privacy selection interface, a plurality of privacy selections from a set of privacy selections, each of one or more of the received privacy selections identifying a set of other users who can access the posted information content;
    updating the user profile to incorporate the received privacy selections for the posted information content;
    generating, by a processor, a narrative summary of the sets of other users identified by the received privacy selections that can access the posted information content, the narrative summary comprising a text statement that identifies the sets of users who can access the information content based on the privacy selections, wherein the received privacy selections contain fewer than all of the set of privacy selections; and
    displaying the generated narrative summary to the user in a privacy summary interface associated with the posted information content, the privacy summary interface separate from the privacy selection interface.

16. The computer program recited in claim 15, further comprising:
    receiving a request by a second user to access the user profile;
    determining if the second user is identified by the privacy selections; and responsive to a determination that the second user is identified by the privacy selections, displaying the posted information content to the second user.

17. The computer program recited in claim 15, wherein the privacy summary interface comprises a portion of the user profile.

18. The computer program recited in claim 15, wherein receiving a plurality of privacy selections from a set of privacy selections at the privacy selection interface comprises receiving a selection of one or more individual users from the user.

19. The computer program recited in claim 15, wherein the posted information content comprises a status posted to the user profile.

20. The computer program recited in claim 15, wherein the posted information content comprises an image posted to the user profile.

21. The computer program recited in claim 15, wherein the generated narrative summary of the sets of other users comprises a categorization of the sets of other users into one or more groups or networks.

\* \* \* \* \*

UNITED STATES PATENT AND TRADEMARK OFFICE
CERTIFICATE OF CORRECTION

| | | |
|---|---|---|
| PATENT NO. | : 9,049,203 B2 | |
| APPLICATION NO. | : 13/533883 | |
| DATED | : June 2, 2015 | |
| INVENTOR(S) | : Mark Zuckerberg et al. | |

It is certified that error appears in the above-identified patent and that said Letters Patent is hereby corrected as shown below:

Title page, item (57), Abstract:
Line 1, replace "A system and method for is provided. The present invention," with
--The present invention--.

Signed and Sealed this
Twenty-sixth Day of July, 2016

Michelle K. Lee
*Director of the United States Patent and Trademark Office*